(12) United States Patent
Moody et al.

(10) Patent No.: US 7,368,697 B2
(45) Date of Patent: May 6, 2008

(54) SYSTEM FOR IDENTIFYING A PHOTOELECTRIC SENSOR ARRAY SIZE HAVING A DETECTOR FOR DETERMINING DISCONTINUITY IN THE READOUT CHARGE FROM A READOUT REGISTER

(75) Inventors: Ian Moody, Chelmsford (GB); Kevin Hadfield, Chelmsford (GB)

(73) Assignee: EV2 Technologies (UK) Limited (GB)

( * ) Notice: Subject to any disclaimer, the term of this patent is extended or adjusted under 35 U.S.C. 154(b) by 0 days.

(21) Appl. No.: 11/394,211

(22) Filed: Mar. 31, 2006

(65) Prior Publication Data
US 2006/0237628 A1 Oct. 26, 2006

(30) Foreign Application Priority Data
Mar. 31, 2005 (GB) ................................. 0506564.4

(51) Int. Cl.
*H01L 27/00* (2006.01)
(52) U.S. Cl. ................................. 250/208.1; 250/559.19
(58) Field of Classification Search ............ 250/208.1, 250/214 R, 559.24, 559.26, 559.19; 348/315, 348/321; 377/3, 6, 12, 15
See application file for complete search history.

(56) References Cited
U.S. PATENT DOCUMENTS
6,268,929 B1 * 7/2001 Ono ........................... 358/1.6
6,618,084 B1 9/2003 Rambaldi et al.

* cited by examiner

*Primary Examiner*—Que T Le
(74) *Attorney, Agent, or Firm*—Venable LLP; Robert Kinberg

(57) ABSTRACT

In a size determining system, a number of pixels in a dimension of a sensor array of photoelectric devices is determined. A readout register is arranged to receive charge accumulated in the dimension of the sensor array. A clock is connected to apply clock cycle pulses to the readout register to read out the charge from the readout register for a predetermined number of clock cycles known to exceed a supposed maximum number of pixels in the dimension of the sensor array. A discontinuity detector is operative to determine a first discontinuity in the readout charge, representing a last active pixel in the dimension of the sensor array. A counter is arranged to count clock cycles between a first active pixel and the first discontinuity to determine a number of active pixels in the dimension of the sensor array.

35 Claims, 11 Drawing Sheets

Conventional Readout
Video output, $V_{os}$ @ pixel time-frame

Device Identification Mode – pixel clock cycles are set up to exceed (active + blank + dark ref ) elements Video output, $V_{os}$ @ pixel time-frame

Conventional Readout

Video output, Vos @ line / row time-frame

Device Identification mode -

Video output, Vos @ line / row time-frame $V_{ref}$ is midway between the
minimum and maximum amplitudes
of the averaged $V_{os}$ waveform

SYSTEM FOR IDENTIFYING A PHOTOELECTRIC SENSOR ARRAY SIZE HAVING A DETECTOR FOR DETERMINING DISCONTINUITY IN THE READOUT CHARGE FROM A READOUT REGISTER

CROSS-REFERENCE TO RELATED APPLICATION

This application claims the priority of British Patent Application No. 0506564.4 filed Mar. 31, 2005, the subject matter of which is being incorporated herein by reference.

Field of the Invention

This invention relates to identifying a photoelectric sensor array size and in particular a CCD sensor array size. In one embodiment the invention relates to a method of identifying a photoelectric sensor array and in particular a CCD sensor array.

BACKGROUND OF THE INVENTION

Where a variety of different types or sizes of sensor may be connected to an imaging system it is very desirable to determine the number of pixels and lines of a connected sensor array to determine an appropriate clocking scheme. Preferably, not only a size of the array making up the sensor is determined, but also a type of the sensor is identified as a known sensor type, in order to apply, for example, predetermined optimal bias voltages and gain for an output signal. For example, in dental x-ray imaging, a dental surgeon may select one of say three x-ray sensors with differing numbers of pixels dependent, for example, on an area to be x-rayed or the size of a patient's oral cavity. At present, with a manual system, a dental surgeon has disadvantageously to divert his attention from a patient to key into a computer keyboard of an imaging system a type of sensor connected to the imaging system. It is preferable if the imaging system automatically identifies a type of sensor connected to the imaging system. It is known to use an EPROM in association with a sensor, for example connected in series in a connector to the sensor, to provide an identifying signal to an imaging system to identify the type, and possibly a serial number, of the sensor. However, use of an EPROM adds undesirable cost and complexity to the sensor and is dependent on recognition by the imaging system of the identifying signal.

It would also be desirable for an imaging system to be able to detect if a sensor connected to the imaging system has a major fault or to detect that no sensor array is connected.

Moreover, having determined an array size it is very desirable to be able to determine an actual identity of a connected sensor, particularly where more than one sensor of a given array size may be connected to an imaging system. For example, defect maps are typically provided with each sensor, indicating locations of atypical pixels so that readings from the atypical pixels can be corrected and it is necessary to know which sensor is connected in order to use a corresponding defect map. Thus, for example, U.S. Pat. No. 6,618,084-B1 discloses a method of determining the location of defective pixels in a sensor array, storing these locations in a memory associated with the sensor, for example on the same chip as a CMOS sensor, and making corrections for readings, or a lack of a reading, from defective pixels. In circumstances where a plurality of sensors may be connected to an imaging system, it is advantageous instead to store maps of the defects centrally, either in the imaging system or in a central database accessible remotely, and to identify the sensor connected to the imaging system so that a corresponding defect map may be used to correct an image generated by the connected sensor. It is preferable if the imaging system automatically identifies a sensor connected to the imaging system. It is known to use an EEPROM in association with a sensor, for example in series in a connector to the sensor, to provide an identifying signal to an imaging system to identify the sensor. However, use of an EEPROM adds undesirable cost and complexity to the sensor and is dependent on recognition by the imaging system of the identifying signal.

In summary, a known method of improving quality of a CCD image comprises storage of dark and bright/flat field image data, and the correction of dark and bright defects in subsequent images by appropriate processing using the stored data. In order to do this, known CCD drive or imaging systems either require: a fixed, single CCD array sensor with only one corresponding set of stored dark and flat field image data, manual selection of a particular CCD serial number, from a set of serial numbers, in order to retrieve the appropriate dark and flat field data or automatic selection of a particular CCD serial number by reading an EEPROM incorporated into a CCD connector, in order to retrieve the appropriate dark and flat field data.

It would be advantageous to be able to identify a sensor uniquely and automatically from a set of sensors to apply corrections, without the use of a EEPROM.

It would also be advantageous to be able to identify a sensor uniquely for warranty purposes, for example, to determine whether a particular sensor is covered by a particular manufacturer's or supplier's warranty.

SUMMARY OF THE INVENTION

According to a first embodiment of a first aspect of the invention, there is provided size determining means to determine a number of pixels in at least one dimension of a sensor array of photoelectric devices, comprising: readout register means for receiving charge accumulated in the sensor array; clock means to apply clock cycle pulses to the readout register means to read out charge from the readout register means for a predetermined number of clock cycles known to exceed a number of pixels in the at least one dimension of the sensor array; discontinuity detection means to determine a first discontinuity in the readout charge, representing a last active pixel in the at least one dimension of the sensor array; and counter means to count clock cycles between a first active pixel and the first discontinuity to determine a number of active pixels in the at least one dimension of the sensor array.

Conveniently, the discontinuity detection means is to determine a second discontinuity in the readout charge, representing the first active pixel in the at least one dimension of the sensor array; and to count clock cycles between the first discontinuity and the second discontinuity to determine a number of active pixels in the at least one dimension of the sensor array.

Particularly, the size determining means further comprises comparison means to use the determined number of pixels to identify a type of the sensor array from a predetermined set of array types.

Advantageously, the size determining means is to integrate dark current charge in the sensor array for a predetermined period of time and to transfer charge from active pixels of the sensor array into the readout register means.

Alternatively, the size determining means is to integrate dark current charge in the readout register means for a predetermined period of time Advantageously, the size determining means is arranged repeatedly to apply clock cycle pulses to the readout register means for different durations of the predetermined period of time and to obtain an average number of active pixels in the at least one dimension of the sensor array.

Conveniently, the size determining means is to determine a first or second discontinuity by making a comparison of a moving average of accumulated charge in preceding pixels with an instantaneous value.

Conveniently, the photoelectric devices comprise CCD devices.

Alternatively, the photoelectric devices comprise CMOS devices.

According to a second embodiment of the first aspect of the invention, there is provided size determining means to determine a number of pixels in a line of a sensor array of photoelectric devices, comprising: readout register means for receiving charge accumulated in the sensor array; clock means to apply clock cycle pulses to the readout register means to read out charge from the readout register means for a predetermined number of clock cycles known to exceed a number of pixels in the readout register; discontinuity detection means to determine a first discontinuity in the readout accumulated charge, representing a last active pixel in the line of the array; and counter means to count clock cycles between a first active pixel and the first discontinuity to determine a number of active pixels in the line of the array.

Conveniently, the discontinuity detection means is arranged to determine a second discontinuity in the readout accumulated charge, representing a first active pixel in the line; and the counter means is arranged to count clock cycles between the first discontinuity and the second discontinuity to determine a number of active pixels in the line of the sensor array.

According to a third embodiment of the first aspect of the invention, there is provided size determining means to determine a number of lines of a sensor array of photoelectric devices, comprising: readout register means for receiving charge accumulated in the sensor array; clock means to apply clock cycle pulses to the readout register means to read out charge from the readout register means for at least one pixel for each line of the sensor array for a predetermined number of clock cycles known to exceed a number of lines in the sensor array; discontinuity detection means to determine a first discontinuity in the readout accumulated charge, representing a last active line of the sensor array; and counter means to count clock cycles between a first pixel and the first discontinuity to determine a number of active lines of the array.

Conveniently, the discontinuity detection means is arranged to determine a second discontinuity in the readout accumulated charge, representing a first active line of the array; and the counter means is arranged to count clock cycles between the first discontinuity and the second discontinuity to determine a number of active lines of the sensor array.

Advantageously, the size determining means is arranged additionally to label the photoelectric sensor array, by accumulating charge in at least a portion of the sensor array; and further comprising: read-out means to read out the accumulated charge to form an image; feature extraction means to determine, from the image, features of the sensor array comprising at least one of locations of atypical pixels and relative gray levels corresponding to the atypical pixels, in the at least a portion of the sensor array; signature generation means to generate a storable signature of the sensor array from the features of the sensor array; storage means for storing the storable signature; and comparison means to compare the stored signature with a subsequently generated signature for subsequent identification of the sensor array.

Conveniently, the size determining means is arranged to accumulate charge from a dark current.

Advantageously, the size determining means is arranged to increase dark current by at least one of adjusting bias levels applied to the sensor array, increasing a temperature of the sensor array and applying adapted clocking waveforms.

Conveniently, the size determining means is arranged to determine locations of atypical pixels by subtracting a baseline black level and a dark current floor from the image.

Advantageously, the size determining means is arranged to subtract a baseline black level and dark floor current by forming a first image over a first integration time and forming a second image over a second integration time longer than the first integration time and subtracting the first image from the second image.

Advantageously, the size determining means is arranged to subtract a baseline black level and dark floor current by forming an original image, Gaussian blurring the original image to form a blurred image and subtracting the blurred image from the original image.

Conveniently, the size determining means is arranged to blur the image by Gaussian blurring the image with a filter of radius 16 pixels.

Conveniently, the size determining means is arranged to determine the relative gray levels of atypical pixels by applying a gray level threshold at a level at which a predetermined plurality of pixels have gray levels exceeding the threshold and by successively raising the threshold to the gray level of each of the predetermined plurality of pixels to determine the relative gray level of each of the plurality of atypical pixels.

Conveniently, the size determining means is arranged to determine the relative gray levels of atypical pixels by applying a gray level threshold at a level at which a predetermined plurality of pixels have gray levels exceeding the threshold and by determining a difference in gray level of each of the atypical pixels compared with an average gray level of pixels adjacent to each of the atypical pixels respectively.

Conveniently, the size determining means is arranged to generate a signature by generating a map of the determined locations of the atypical pixels of the at least a portion of the sensor array.

Conveniently, the size determining means is arranged to generate a signature by generating a signature from the determined locations of the atypical pixels and relative gray levels of the atypical pixels.

Conveniently, the size determining means is arranged to generate a signature, by generating a histogram from the relative gray levels of the atypical pixels.

Conveniently, the size determining means is arranged to rank the atypical pixels are in order of gray level.

Conveniently, the size determining means is arranged to generate a signature by fitting a polynomial equation to dark signal non-uniformity of the image.

Conveniently, the size determining means is arranged to store the storable signature by storing associable with the storable signature at least one of a serial number of the sensor, a date of manufacture of the sensor, and a warranty period for the sensor.

Conveniently, the size determining means is arranged to store the storable signature by storing associable with the storable signature at least one of drive biases suitable for use with the sensor and image correction information including at least one of dark field, flat field and blemish correction image files.

Conveniently, the size determining means is arranged to store the storable signature in a database.

Conveniently, the size determining means is arranged to store the storable signature in a database remote from an imaging system to which the sensor is connectable, such that the database is accessible to the imaging system over a communications network.

Conveniently, the size determining means is further arranged to generate a new signature of the sensor array; and to match the new signature of the sensor array with the stored signature to identify the sensor array.

Conveniently, the size determining means is further arranged to retrieve at least one of a serial number of the sensor, a date of manufacture of the sensor, and a warranty period for the sensor associable with the stored signature.

Conveniently, the size determining means is further arranged to retrieve at least one of optimum drive biases suitable for use with the sensor and image correction information including at least one of dark field, flat field and blemish correction image files associable with the storable signature.

According to a second aspect of the invention, there is provided an imaging system comprising size determining means to determine a number of pixels in at least one dimension of a sensor array of photoelectric devices, comprising: readout register means for receiving charge accumulated in the sensor array; clock means to apply clock cycle pulses to the readout register means to read out charge from the readout register means for a predetermined number of clock cycles known to exceed a number of pixels in the at least one dimension of the sensor array; discontinuity detection means to determine a first discontinuity in the readout charge, representing a last active pixel in the at least one dimension of the sensor array; and counter means to count clock cycles between a first active pixel and the first discontinuity to determine a number of active pixels in the at least one dimension of the sensor array.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
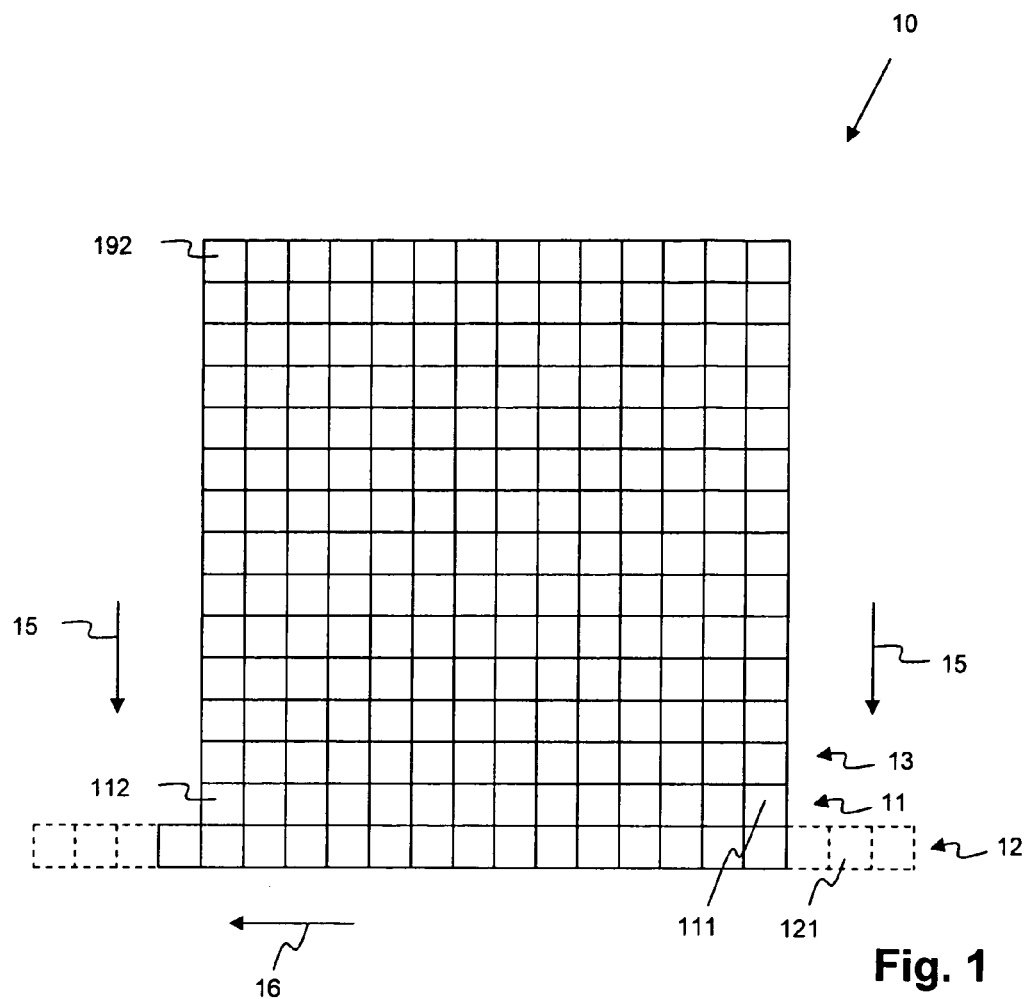
FIG. 1 is aschematic drawing of a first sensor array to which the method of the invention may be applied.

Throughout the description, identical reference numerals are used to identify like parts.

Figure 2:
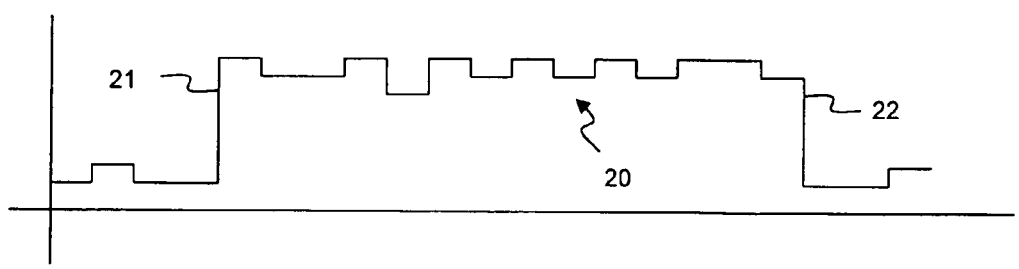
FIG. 2 is a trace of an output signal from the sensor array of FIG. 1.
Figure 11:
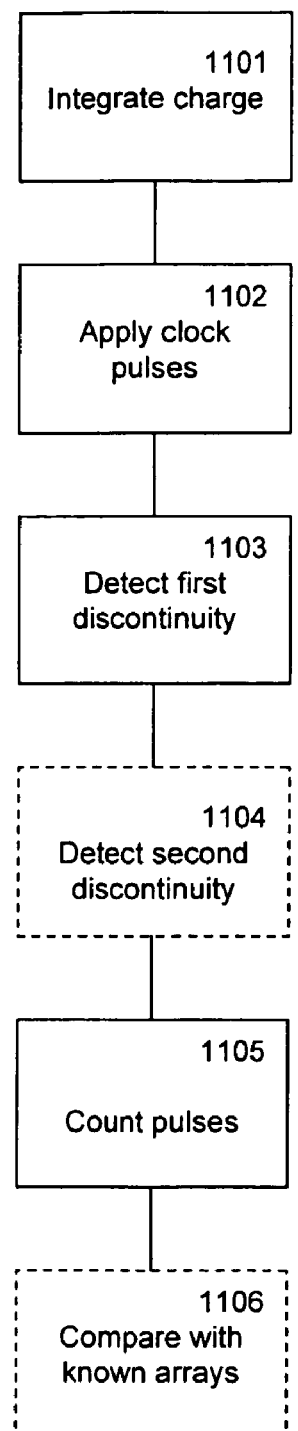
FIG. 11 is a flowchart of the method of the invention.

Referring to FIGS. 1, 2 and 11, charge from a CCD array 10 is integrated, step 1101, in darkness for a time that allows sufficient dark current to accumulate to be reliably measured, e.g. an average dark current of 1% of full well capacity, for an Advanced Inverted Mode Operation (AIMO) device, clocked in AIMO mode, this is approximately 10 seconds at room temperature. One line, for example a first line 11, of CCD charge is transferred in direction of arrow-headed lines 15 to a register 12 and read out, in direction of arrow-headed line 16, for example to a charge detector amplifier, not shown, applying, step 1102, a plurality of clock cycles that exceeds a supposed maximum number of pixels/line for the subject CCD array, e.g. for a known dental x-ray sensor CCD family, more than 1262 clock cycles. In this manner, so-called "virtual pixels" 121 will be read after a last of the actual pixels 111 of the first line 11 of array 10. These virtual pixels 121 will gain some dark current charge during their passage through the register 12. Transfer of a succeeding line 13 into the register 12 is delayed while the register 12 is read for the virtual pixels 121 associated with a currently-read line 11. Referring to FIG. 2, data 20 read from the current line 11 is analysed to detect, steps 1103, 1104, any significant discontinuities 21, 22 in the output signal, for example by subtraction of a moving average from an instantaneous signal. If a detected discontinuity 21, 22 in dark current is less distinct than sufficient definitively to establish presence of a discontinuity, due, for example, to non-uniformity of dark current over the CCD array, further measurements may be made to resolve the ambiguity. For example, an average length of line may be determined over several lines of the array 10, or when counting a number of lines in a manner described herein below, rather than a number of pixels per line, averaged over several columns of pixels. An alternative continuous transfer clocking scheme, for example Time-Delay Integration (TDI) mode, automatically averages dark current over all the lines of the array 10. Alternatively, data generated by dark currents may be collected several times for a range of integration periods, which would at least tend to cancel out temperature sensitivity of dark current. Finally, a fuzzy logic approach may be used, wherein a specific sensor type is determined according to measured pixels per line, and/or lines per field, falling within a predetermined range, for example it may be sufficient to identify a type of sensor if it is determined that a number of pixels per line is between 1200 and 1300. This requires prior knowledge of all CCD sensors which will be used with an imaging system, but often this is the case.

Referring to FIG. 2, a first detected discontinuity 21 indicates a transition from blank elements to image elements. A second discontinuity 22 indicates a transition from image elements to blank elements. A number of clock cycles between the first discontinuity and the second discontinuity is counted, step 1105, and corresponds to a number of active pixels for a sensor array under test, and may be sufficient to identify a particular device type within a family, by comparing, step 1106, the pixel count with known pixel counts of know arrays. Alternatively, if clocking does not begin before a first active pixel 112, only the second discontinuity 22 is detected and the number of pixels per line corresponds to a number of clocking pulses between a first detected pixel 112 and the second discontinuity 22.

If no discontinuity 21, 22 is detected, it is evident that the CCD array has a major fault, or that no CCD array is connected.

Figure 3:
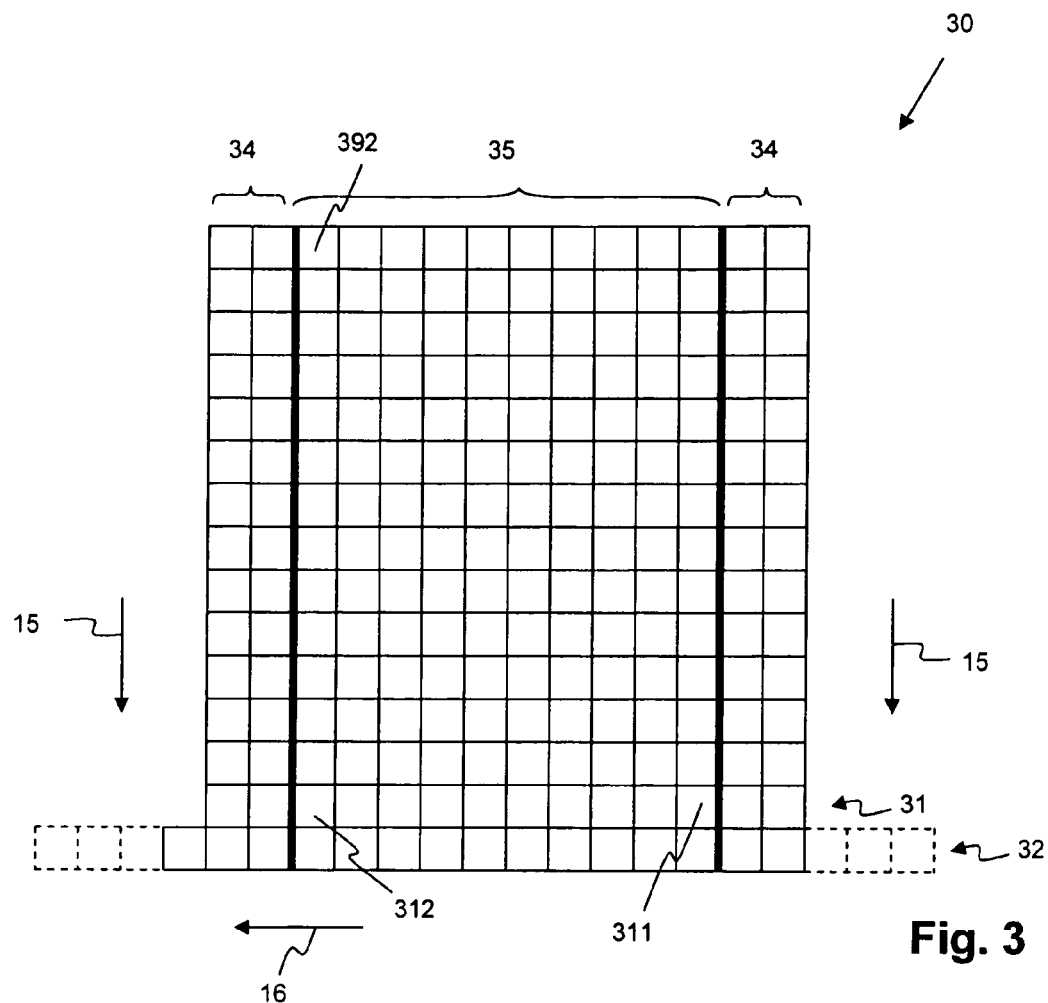
FIG. 3 is a schematic drawing of a second sensor array to which the method of the invention may be applied.
Figure 4:
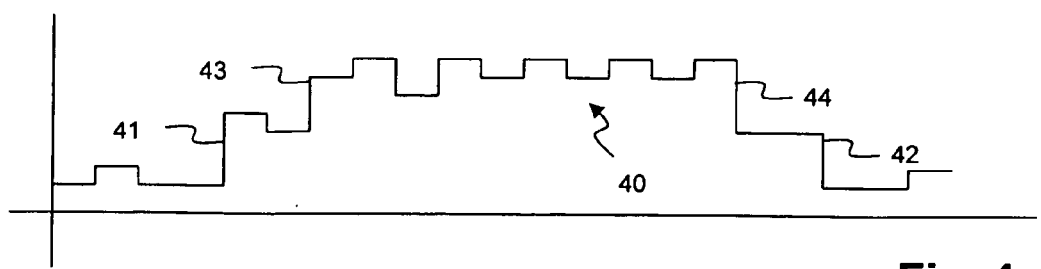
FIG. 4 is a trace of an output signal from the sensor array of FIG. 3.
Figure 12:
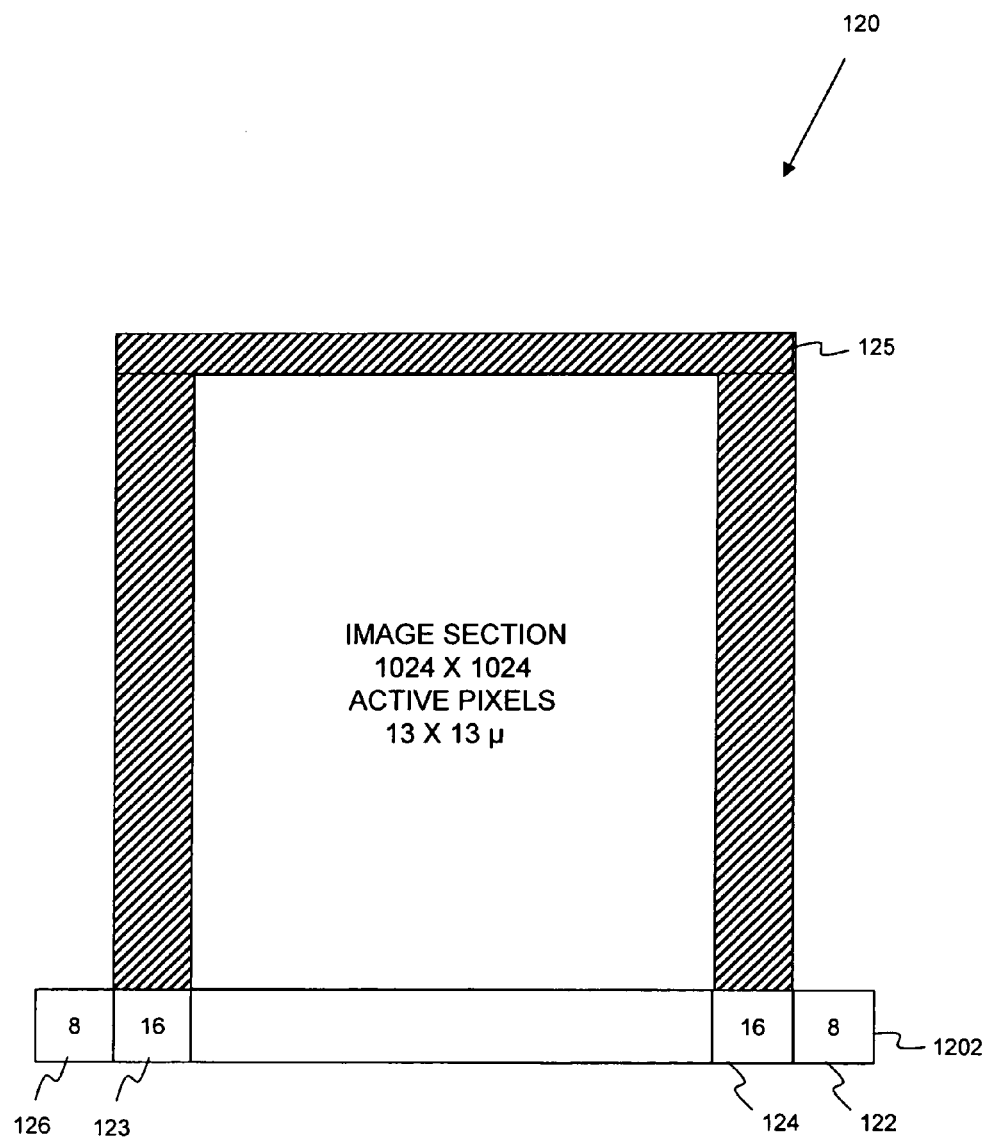
FIG. 12 is a schematic drawing of a further known photoelectric array suitable for use with the invention.

Referring to FIGS. 3 and 4, the method may be extended to determine a number of run-off pixels at an end of a line in an array 30 having such run-off pixels 34. Typically additional pixels are provided in the image area for dark reference and over-scanning purposes. Thus, as shown in FIG. 12, a typical array 120 may have 8 leading blank elements 126 and 8 terminal blank elements 122 in the register 1202 and 16 leading and trailing dark reference pixels 123, 124 in each row or line of the array and 3 terminal dark reference rows 125. Referring again to FIG. 3, these run-off pixels 34 do not generate charge from illumination, as does an illuminated main image portion 35 of the array, but still collect dark current themselves. Further discontinuities 43, 44 may therefore be detected in the data 40 read from the register, towards an end of a pixel line 31, in addition to discontinuities 41, 42 indicating boundaries of the array. Alternatively, only dark current collected in the readout register 32 may be read, with no transfer from an image portion 35, so that there is measurable dark current present in all register elements, including register elements corresponding to runoff elements 34. A detected number of runoff elements 34 could be used as additional information to identify a known sensor array 30, or to help define a clocking scheme, without knowledge of a specific connected sensor.

Alternatively, or where determining a number of pixels in a line is not sufficient to identify a known sensor type uniquely, the number of lines in an array 10, 30 may similarly be determined, for example by reading a first pixel 112, 312 in the first line 11, 31 and in each other line and clocking past a supposed maximum number of lines to determine a discontinuity in an output signal after the last actual pixel 192, 392 has been read.

Figure 5:
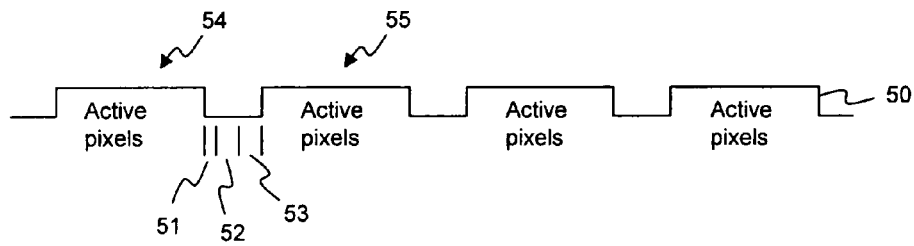
FIG. 5 is a averaged trace of an output signal from the sensor array of FIG. 3 using a clock count corresponding to a predetermined number of pixels/line, as in the prior art.
Figure 6:
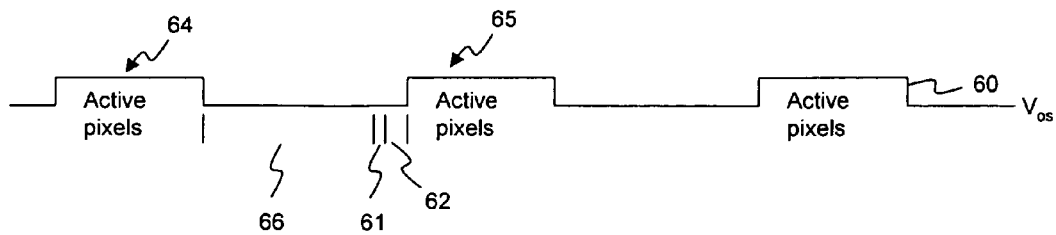
FIG. 6 is a averaged trace of an output signal from the sensor array of FIG. 3 using a clock count greater than a number of pixels/line, according to the invention.

The method step of counting pixels, step 1105, in a line may be better understood by reference to FIGS. 5, 6 and 12. In a known method of reading an array output from an array 120, as illustrated in FIG. 5, an averaged output 50 from the array is clocked for a plurality of clock cycles corresponding to a known number of pixels/line and an output 51, 52, 53 corresponding only to blank and dark elements at the ends of each row exists between output 54 corresponding to active pixels in a first row and output corresponding to active pixels 55 in a succeeding row. Referring to FIG. 6, on the other hand, an averaged video output 60 in an array clocked according to the invention with a plurality of clock signals exceeding a plurality of pixels/line, has an output 66 corresponding to the virtual or null pixels as well as outputs 61, 62 corresponding to blank pixels and reference pixels between an output 64 corresponding to active pixels in a first row and output 65 corresponding to active pixels in a succeeding row.

Figure 9:
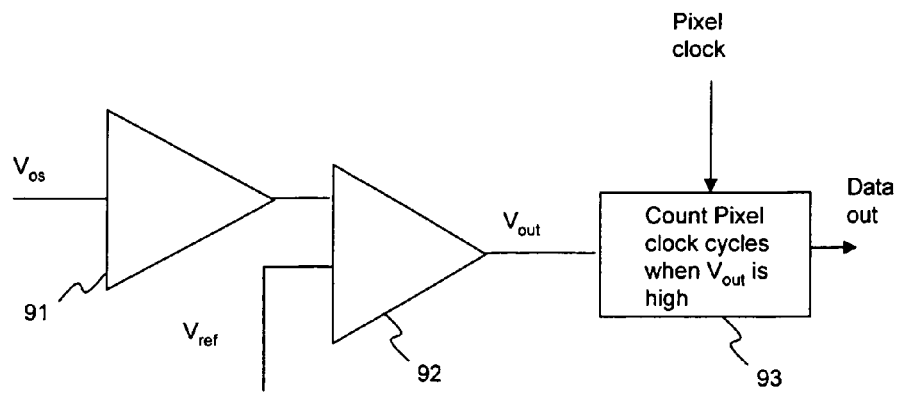
FIG. 9 is a schematic diagram of a circuit, for use in the invention, for determining a number of pixels in a line of the array of FIG. 3 from the averaged output trace of FIG. 6.

Referring to FIG. 9, the $V_{os}$ output 60 is amplified by an amplifier 91 before being input to a first input of a comparator 92. A reference voltage $V_{ref}$, corresponding to a voltage midway between maximum and minimum amplitudes of the averaged output $V_{os}$ is input to a second input of the comparator 92 to output a signal $V_{out}$, which is high when $V_{os}$ exceeds $V_{ref}$, to a counter 93 which is clocked at the pixel clocking rate. The counter 93 counts pixel clock cycles while $V_{out}$ is high to output the number of active pixels in one or more rows.

Figure 7:
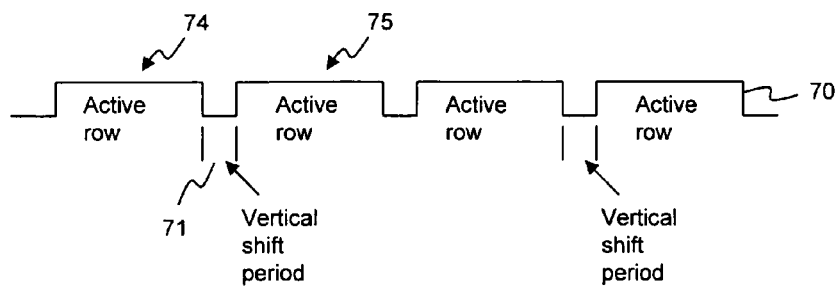
FIG. 7 is a averaged trace of an output signal from the sensor array of FIG. 3 using a clock count corresponding to a predetermined number of lines in the array, as in the prior art.
Figure 8:
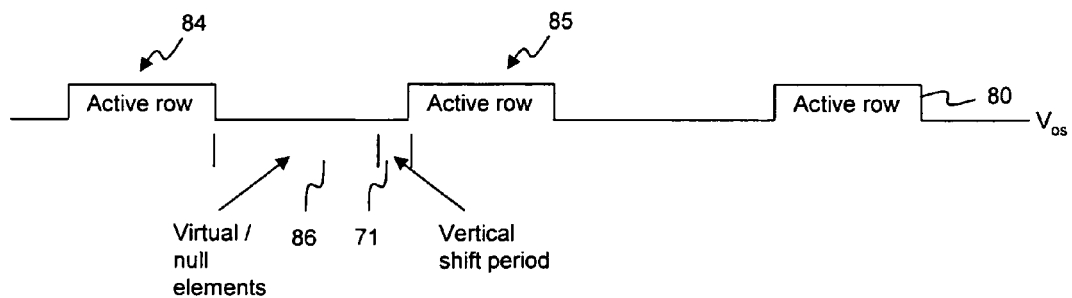
FIG. 8 is a averaged trace of an output signal from the sensor array of FIG. 3 using a clock count greater than a number of lines in the array, according to the invention.
Figure 10:
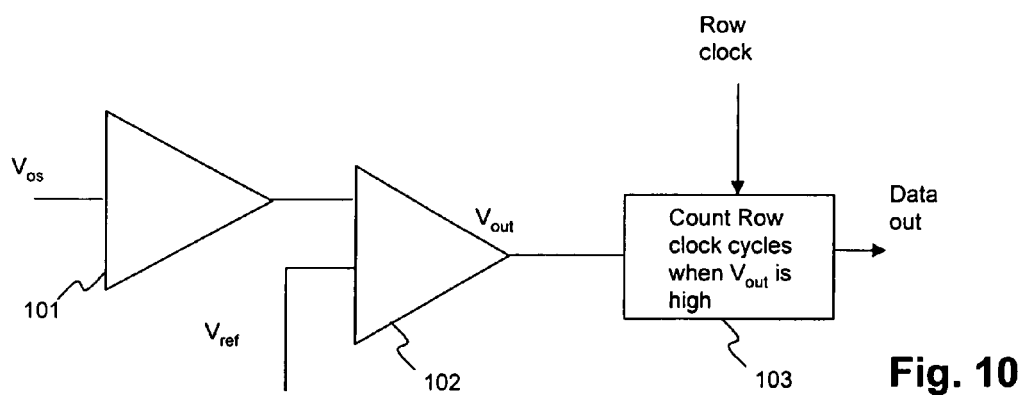
FIG. 10 is a schematic diagram of a circuit, for use in the invention, for determining a number of lines in the array of FIG. 3 from the averaged output trace of FIG. 8.

The method step of counting lines or rows in an array may be better understood by reference to FIGS. 7, 8 and 10. In a known method of reading an array output from an array 120, as illustrated in FIG. 7, an averaged output 70 from the array is clocked for a plurality of clock cycles corresponding to a known number of lines or rows and an output 71 corresponding only to a vertical shift period exists between output 74 corresponding to active pixels in a first row and output 75 corresponding to active pixels in a succeeding row. Referring to FIG. 8, on the other hand, an averaged video output 80 in an array clocked according to the invention with a plurality of clock signals exceeding a plurality of rows or lines, has an output 86 corresponding to the virtual or null pixels as well as output 71 corresponding to the vertical shift between an output 84 corresponding to active pixels in a first row and output 85 corresponding to active pixels in a succeeding row.

Referring to FIG. 10, the $V_{os}$ output 80 is amplified by an amplifier 101 before being input to a first input of a comparator 102. A reference voltage $V_{ref}$, corresponding to a voltage midway between maximum and minimum amplitudes of the averaged output $V_{os}$ is input to a second input of the comparator 102 to output a signal $V_{out}$, which is high when $V_{os}$ exceeds $V_{ref}$, to a counter 103 which is clocked at the row clocking rate. The counter 103 counts row clock cycles while $V_{out}$ is high to output the number of active rows.

It will be understood that the method is also applicable to CCD arrays in which pixels are in arrangements other than a standard rectangular array.

It will be further understood that the method is also applicable to other sensor types such as CMOS device sensors.

Whilst dark current is a convenient way of gathering signal charge, since it is inherent in silicon of the array, array size can also be determined if signal charge is generated in the array 10, 30 by some other technique, for example, light could briefly be produced over the area of the sensor, by pulsing an LED or opening a shutter, or, for a dental x-ray sensor with a phosphor, by stimulating the phosphor, by light or by passing an electric current through the phosphor.

Having determined the size of an array as an initial procedure, it may be desirable to identify a particular sensor of that array size.

Figure 13:
FIG. 13 is a dark image produced by a sensor array, before processing the image according to an embodiment of the present invention.
Figure 14:
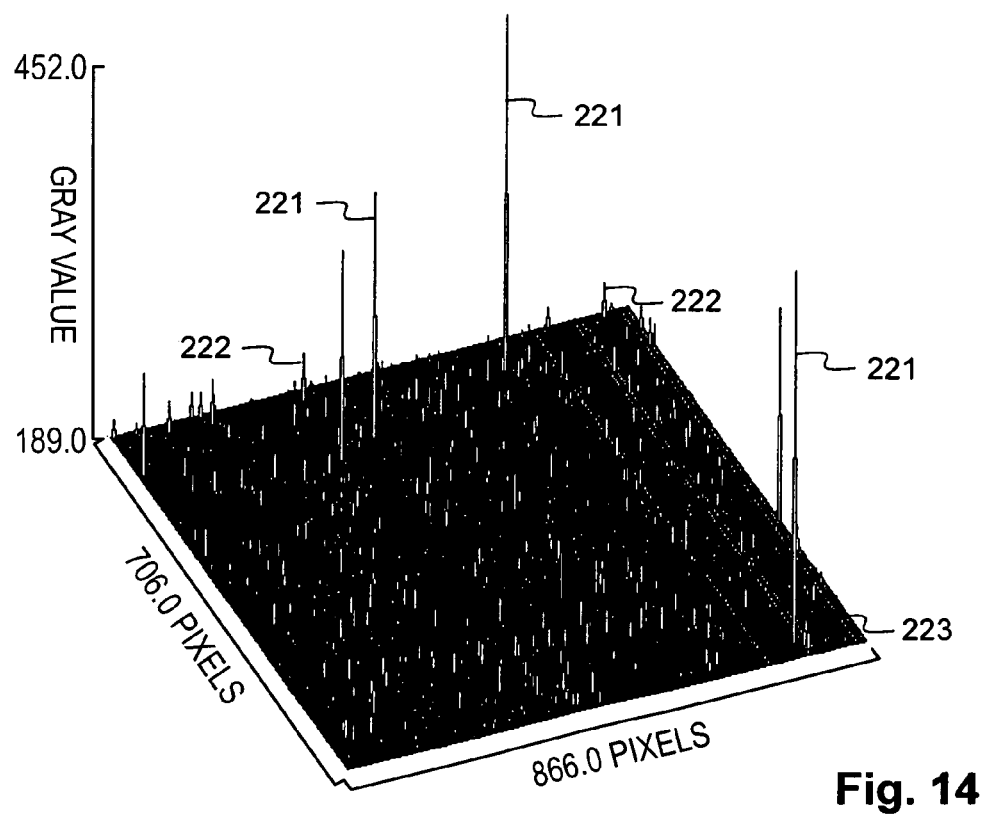
FIG. 14 is a plot of gray values of the image of FIG. 13 after processing according to the embodiment of the present invention to reveal dark signal (DS) spikes.
Figure 15:
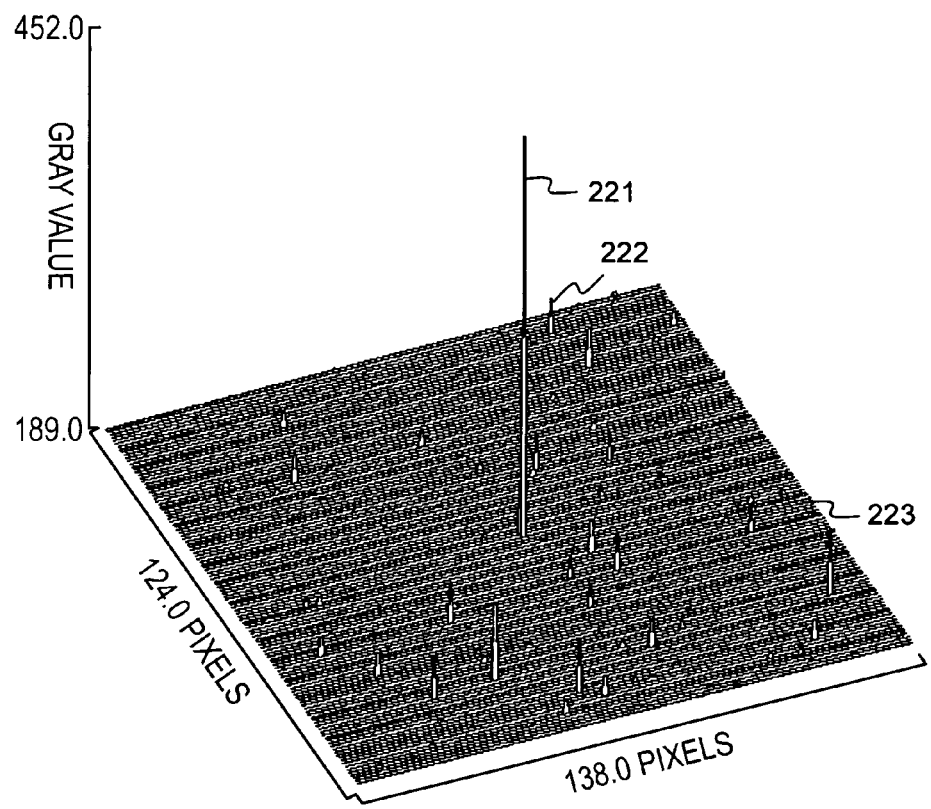
FIG. 15 is a close-up of a high amplitude DS spike, numerous low amplitude spikes and DS background of the plot of gray values of FIG. 14.

Referring to FIG. 13, which shows a dark image 200 produced by a sensor array, a dark current variation of an imaging sensor is characteristic of a particular sensor because the dark current variation is associated with local crystal dislocations in bulk material from which an array of devices of the sensor is constructed. Using suitable signal and software processing, single pixel dark current high points 221, 222, hereinafter called dark current spikes, DS (dark signal) spikes or spikes, as shown in FIG. 14, and area non-uniformity of dark current 223, hereinafter called dark signal non-uniformity (DSNU), can be used to identify a particular imaging sensor uniquely from a number of sensors.

Although dark current spikes may be used to identify an array, in principle, a given image sensor can be identified according to the invention by non-uniformity of a number of different electro-optical aspects of its array, for example, dark signal spikes, dark signal columns, dark signal non-uniformity, fixed traps, signal level dependent traps, photo-response spots, photo-response columns and photo-response non-uniformity. However, the invention is primarily described herein based on x,y mapping of non-uniformities of the dark signal in order to identify a given image sensor.

To obtain a dark image 200, as shown in FIG. 13, charge generated in a CCD array is integrated in darkness for a sufficient time to accumulate a dark image containing moderately high dark current and a number of hot pixel/dark current spikes 221, 222, for example an average dark current of 2% of full well capacity—for an Advanced Inverted Mode Operation (AIMO) device for 5 seconds at 37° C. A resulting image 200 is read out from the array and stored.

Before each use of the sensor in which it is required to identify the sensor, a dark image is again obtained. A general correlation may be expected between the measured dark current image and the previously stored dark current image, with which the measured image may be matched. A matching technique need not be applied to the whole array, but to any predetermined stored portion. For example, a dark current profile of say a first 50 pixels and 50 lines may be matched with a corresponding portion of the previously acquired dark current image. This reduces required mathematical processing and, assuming all sensors to be identified are larger than the portion, say 50 pixels×50 lines, permits matching a sensor without having first to determine an array size of the sensor.

A matching technique need not be applied to the whole array, but to the detection of the most significant atypical pixels, e.g. in terms of single pixel deviation in amplitude from nearest neighbours. In one embodiment, this means detecting the brightest, say 50, pixels in a dark image.

If a selected portion of the sensor fails to produce any match, or fails to produce a unique match, other portions or the whole sensor are subsequently compared.

Various matching techniques may be used to seek to match a stored image to a measured image. The ratio of dark current in a captured image to an original image can be used as an estimator for a scaling factor or a figure of merit as to how close the correlation is expected to be. However, wherever possible, single distinctive pixels are searched out. For example, a threshold is applied to the image at a grey level, A, just above a mean grey level for the whole image, and detected atypical pixels plotted in an x-y table. Alternatively, a maximum grey level of the whole image is detected, then a threshold, B, applied such that 100 'bright' atypical pixels detected and plotted in an x-y table. The use of relative pixel amplitudes is preferred in order to avoid strong dependence on imager temperature. Theoretically, only one previously stored dark current image is needed for each CCD array to be identified. The thresholded images should be a good match to the ones previously stored for the same CCD. Alternatively, only one measured image could be matched against multiple stored images, but that would require storing several dark current images for each CCD array.

An extension of the thresholding method uses dark current images for a range of integration times and thresholds them all at a same level. This may provide extra information to help identification as lower level white defects will then be mapped.

Three basic embodiments are described as examples of suitable processing:

1 Detection of x & y coordinates of spikes and their ranking by amplitude;

2 Calculation of a histogram with bins of relative spike amplitude; and

3 Fitting of a polynomial equation to medium and large area DSNU.

Practically, the first embodiment, detection of x & y coordinates of spikes and their ranking by amplitude, is preferred.

In all cases, the output of the processing is used to construct a concise dark signal (DS) signature in terms of a series of numbers for a particular sensor, e.g. relative amplitude$_{(spike\ 1)}$, x coordinate$_{(spike\ 1)}$, y coordinate$_{(spike\ 1)}$ ... X coordinate$_{(spike\ N)}$, y coordinate$_{(spike\ N)}$, relative amplitude$_{(spike\ N)}$ Generation of DS Signatures In order to generate a DS signature, an imager signal due to dark current must be significantly higher, for example more than three times greater, than readout noise of the imager.

It is also necessary that the dark signal is not so high as to saturate the imager or signal processor, nor so high as to cause significant clipping of DS spikes or imager blooming from DS spike sites.

An integration time for the dark image must be a sufficient time to collect a reasonable amount of dark current. However, in order to hasten signature generation, and to reduce time required for an adequate amount of dark current to build up, it is advantageous temporarily to increase a normal imager dark current by one or more of the following methods:

adjusting bias levels (usually by reducing a substrate voltage);

increasing device temperature; or changing clocking waveforms applied to the imager, e.g. if an AIMO CCD is being used, using Non-Inverted Mode Operation (NIMO) waveforms.

Once the sensor has been identified, normal values of the parameters are used for imaging.

Detection of x,y Coordinates of Spikes

Bottom-Up Method

In a bottom-up first embodiment, once a dark image 200 has been generated, a baseline black level and dark current floor are subtracted to allow discrimination of DS spikes 221, 222. This can be done, for example, by one of the following methods:

forming a first image over a very short integration time, e.g. 1 ms, taking a second image at a longer integration time, e.g. 1 s, and subtracting the first image from the second; or taking an original image at a long integration time, e.g. 1 s and Gaussian blurring this image, e.g. with a filter of radius 16 pixels, and subtracting the blurred image from the original image in order to reveal DS spikes.

The whole area average of the image, with baseline previously subtracted, is calculated. A gray level threshold operation is carried out for the image. The threshold is raised from zero gray level until a number of spikes 221, 222 detected is reduced to a number of the order of 100. The gray level threshold is raised further until the lowest of the 100 spikes is just lower than the threshold. The first spike amplitude is then calculated from the formula (current threshold–whole area average). The process is repeated until the positions and amplitudes of all spikes have been measured and recorded.

Figure 17:
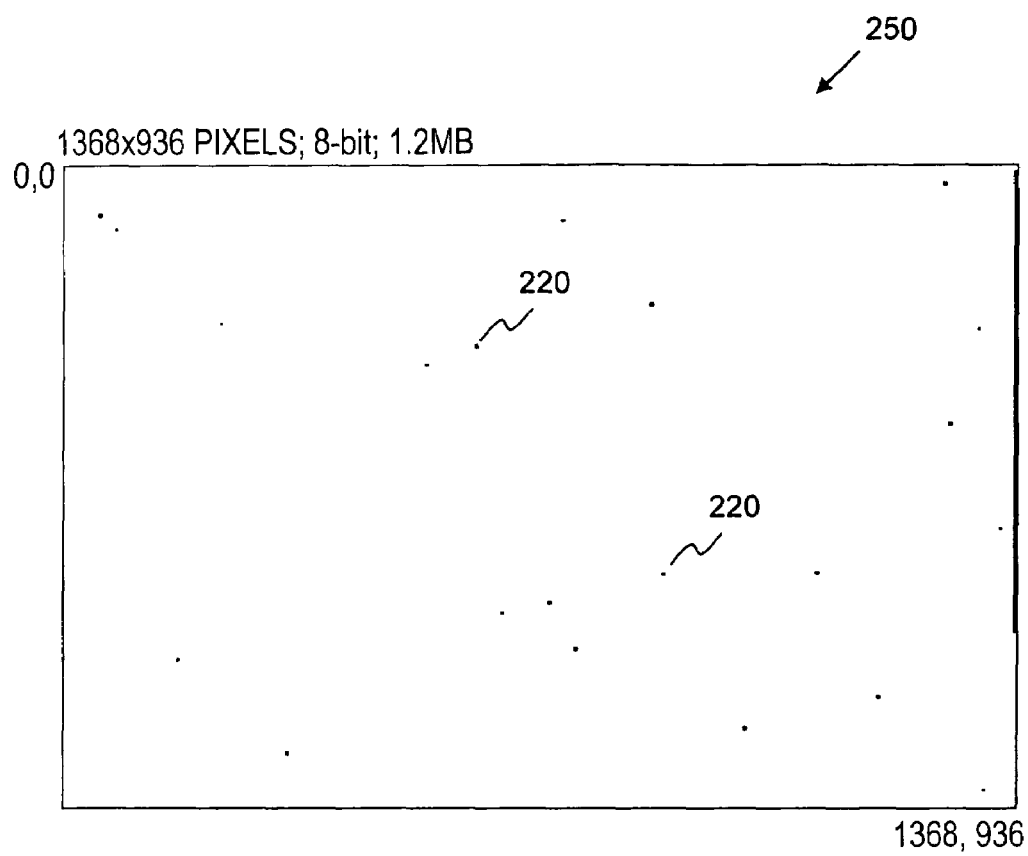
FIG. 17 is a plot of positions of largest amplitude DS spikes in a plot of gray values similar to that of FIG. 14.

FIG. 17 shows an exemplary plot 250 of positions of largest amplitude DS spikes 221 in a plot of gray values, for which the x,y coordinates are determined.

Top-Down Method

In a top-down second embodiment, a threshold operation is carried out for the image. The gray level threshold is reduced from peak white counts until the number of spikes detected is of the order of 100. For each spike detected, the peak amplitude and a local area average of around five pixels radius, centred on the spike, is measured. The amplitude of each spike is then calculated as (peak amplitude—local area average).

Column Defect and Edge Effects

Figure 16:
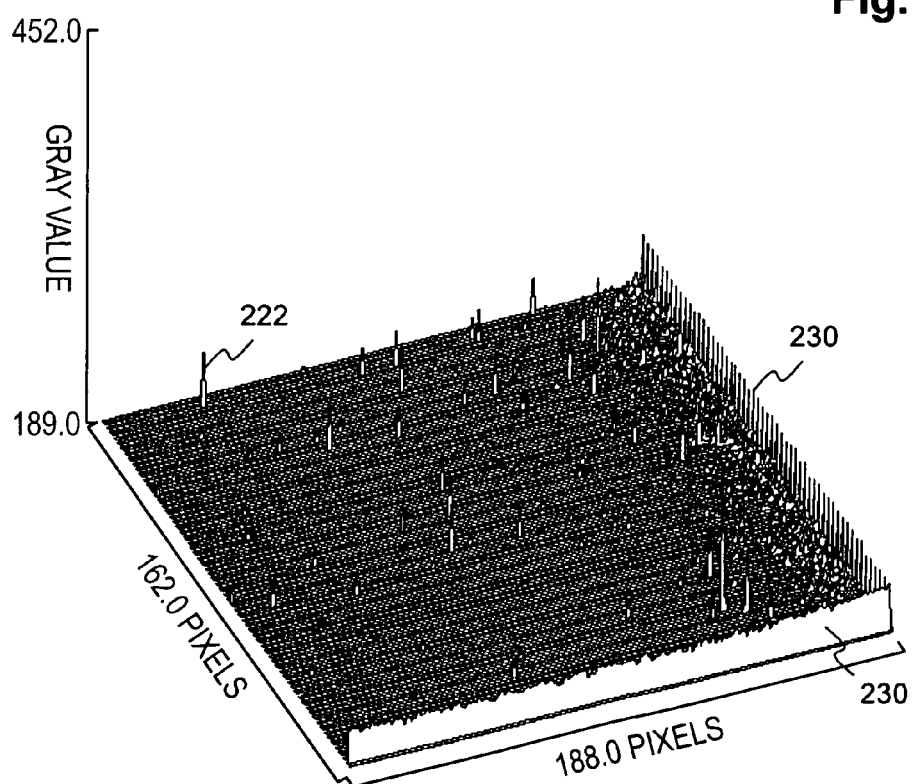
FIG. 16 is close-up of edge effects of the plot of gray values of FIG. 14.

Referring to FIG. 16, an algorithm for counting the spikes 220 should be insensitive to shading 230 at the edges of the image 200, which can be caused by charge leakage. It should also be insensitive to column defects, not shown, where a number (e.g. >10) sensor defects are joined together in a column defect. In preference, the algorithm counts single pixel DS spikes 221, 222 in areas that are known not to be influenced by edge effects 230 or column effects.

Calculation of Histogram with Bins of Relative Spike Amplitude

In a third embodiment, a histogram is calculated from the relative amplitudes of the spikes. The spikes are ranked in order of brightest to least bright pixel, as shown in the following table.

| Spike Ref | Spike Position X | Spike Position Y | Grey Value | Relative Amplitude |
|---|---|---|---|---|
| 1 | 981 | 821 | 522 | 1.00 |
| 2 | 845 | 203 | 440 | 0.70 |
| 3 | 717 | 80 | 403 | 0.56 |
| 4 | 164 | 721 | 400 | 0.55 |
| 5 | 863 | 596 | 394 | 0.53 |
| 6 | 737 | 705 | 389 | 0.51 |
| 7 | 51 | 71 | 386 | 0.50 |
| 8 | 593 | 263 | 363 | 0.41 |
| 9 | 1273 | 377 | 352 | 0.37 |
| 10 | 631 | 652 | 343 | 0.34 |
| 11 | 1083 | 594 | 340 | 0.33 |
| 12 | 521 | 290 | 338 | 0.32 |
| 13 | 1265 | 27 | 332 | 0.30 |
| 14 | 322 | 857 | 308 | 0.21 |
| 15 | 1322 | 910 | 287 | 0.13 |
| 16 | 1314 | 238 | 271 | 0.07 |
| 17 | 226 | 230 | 264 | 0.05 |
| 18 | 74 | 92 | 257 | 0.02 |
| 19 | 699 | 637 | 256 | 0.02 |
| 20 | 1171 | 775 | 256 | 0.02 |
| 21 | 1346 | 530 | 251 | 0.00 |

From this table a dark signal signature may be derived from the relative amplitudes and (x,y) coordinates of the spikes ranked in order of relative amplitude:

DS Signature=(1.0, 981, 821, 0.7, 845, 203, 0.56, 717, 80 . . . 0.0, 1346, 530)

Further aspects of the image may be used to check the correctness of the Spike Position table. For example:

X max: 1368: maximum pixel number in the x direction for the known sensor

Y max: 936: maximum pixel number in the y direction for the known sensor

Grey max: 4096: number of bits of the A to D

Standard deviation: 3.36

Mean: 182: check that no spike is less than (mean+3×std dev=192.1)

Max: 522: check no spike exceeds this value

Figure 18:
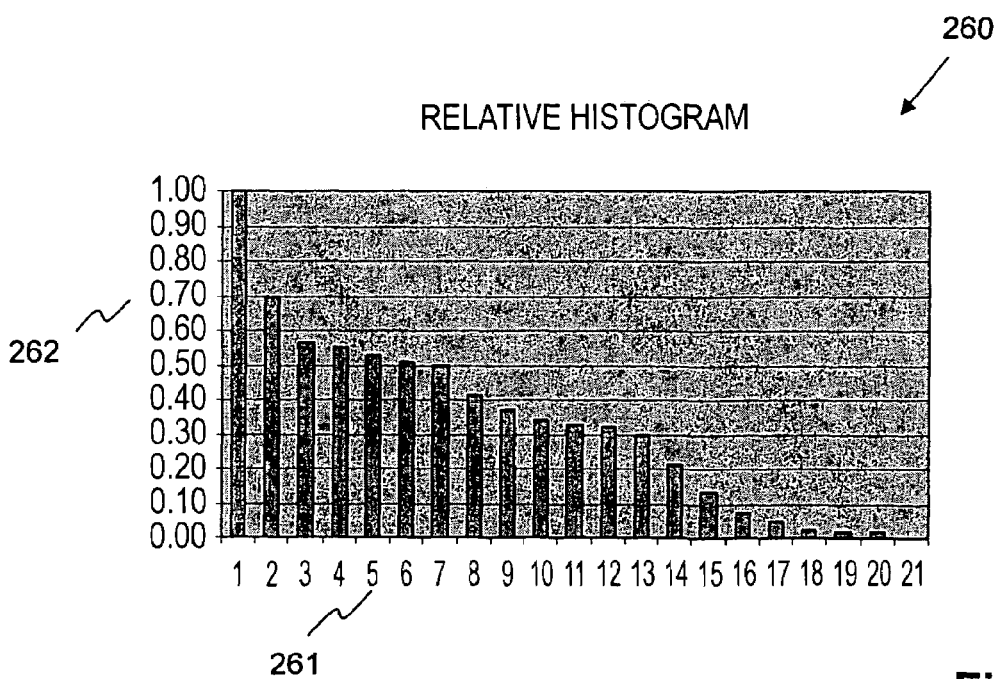
FIG. 18 is a relative histogram of relative amplitudes of atypical pixels in the plot of FIG. 14.

A table of x,y coordinates and spike amplitude results from the embodiment described above. In this third embodiment, this data is re-ordered to construct a histogram 260, see FIG. 18, with spikes 261 from lowest to highest relative spike amplitude 262. Alternatively, the data is allocated to relative spike amplitude ranges or bins to construct a frequency histogram with say 20 bins from lowest to highest relative spike amplitude. The use of relative spike amplitudes is important in order to avoid a necessity of scaling spike amplitude with temperature.

In a related embodiment, relative spike amplitudes may be serially calculated on the fly.

Fitting of Polynomial Equation to Medium and Large Area DSNU

In a fourth embodiment, a polynomial equation is fitted to medium or large area DSNU 223. A first image is formed over a very short integration time, e.g. 1 ms, and a second image formed over a longer integration time, e.g. 1 s and the first image is subtracted from the second image.

Row Profile

Figure 19:
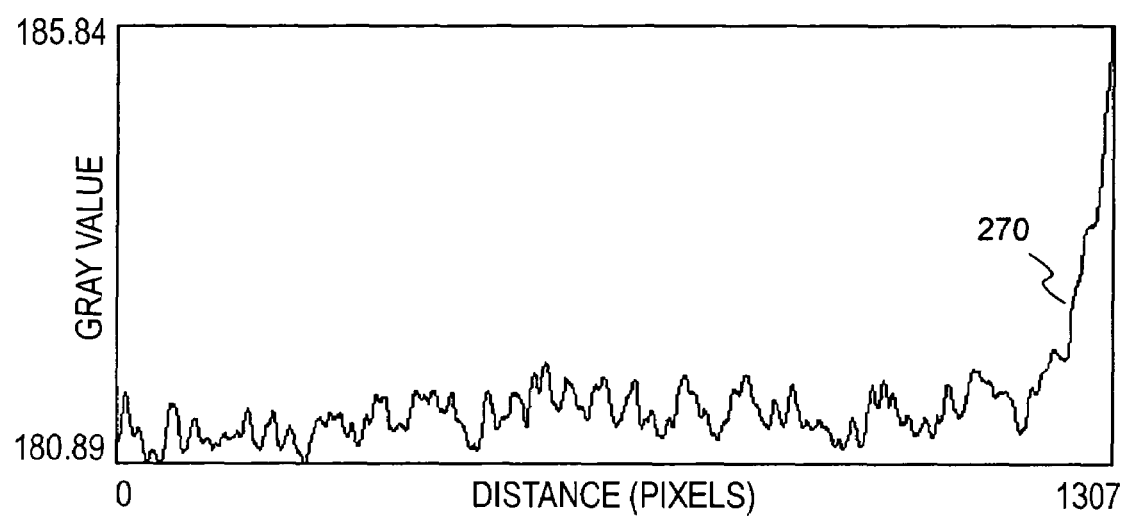
FIG. 19 is a dark signal non-uniformity (DSNU) row profile of distance in pixels as abscissa and gray value as ordinates of the plot of FIG. 14.

Column binning may be used, i.e. combining data from adjacent pixels in a column direction, in order to reduce effects of noise. Typically column binning will be 10 to 100 pixels high. A polynomial equation is fitted to the resulting row profile 270, as shown in FIG. 19.

Column Profile

Alternatively, row binning may be used, i.e. combining data from adjacent pixels in a row direction, in order to reduce effects of noise. Typically row binning will be 10 to 100 pixels high.

A linear equation is fitted to the dark current ramp that results from pixels read out later from the array that contains greater dark signal. This dark current ramp is subtracted from the image. A polynomial equation is fitted to the column profile.

Use of DS Signatures to Identify an Imager

The probability of the x,y coordinates of spikes identifying a particular imager increases rapidly with the number of spikes. Although around 100 spikes are mapped for each device, a match on a first 10 to 50 spikes will usually be sufficient. If matching all 100 spikes is inconclusive, further matching using one or both of the third embodiment of using histograms and the fourth embodiment of fitting polynomials can also be used.

When an imaging device of unknown serial number is connected to the imaging system, a dark image is first generated, which is then processed to give the DS signature. This DS signature is then compared with local or remote databases/lookup tables in order to identify the device uniquely.

Once identified, the device can then be associated with information such as date of manufacture, warranty remaining, optimum drive biases required etc. It can also be associated with image correction information such as dark field, flat field and blemish correction image files.

Once the processing has been implemented at both the point of manufacture and the point of use, the system is more economical to run, less prone to errors, e.g. resulting from repetitive programming, and more flexible than other systems that, for example, use a serial EEPROM attached to the imaging device to store serial number data.

The DS signature method of the invention is usable in combination with conventional printed labelling or EEPROM identification as a backup or check to confirm that an imager does have the correct serial number. The DS signature is intrinsic to the imaging device alone.

The DS signature is compact, and is generated by a method which can be easily automated, is fast, and does not require the storage of large image files to identify a particular imager uniquely.

Once a particular CCD serial number has been identified, the stored dark field and bright field image data is used to correct subsequent images by appropriate processing in a known manner.

It will be understood that the method is applicable to CCD arrays in which pixels are in patterns other than a standard rectangular array.

It will be further understood that the method is also applicable to other sensor types such as CMOS device sensors.

Whilst dark current is a convenient way of gathering signal charge, since it is inherent in silicon of the array, an array may be identified if signal charge is generated in the array by some other technique, for example, light could briefly be produced over the area of the sensor, by pulsing an LED or opening a shutter, or, for a dental x-ray sensor with a phosphor, by stimulating the phosphor, by light or by passing an electric current through the phosphor.

It will be understood that where a plurality of sensor arrays are to be used with an imaging system, as, for example, in a dental surgery, maps of atypical pixels of all the sensor arrays to be used with the imaging system may be stored in the imaging system. Alternatively, maps of atypical pixels may be stored centrally in a database and the maps accessed over a communications network, for example the maps may be stored on a website and accessed using the Internet. Alternatively, or in addition, a manufacturer may have a map database of all devices manufactured in a given time period so that any device returned to the manufacturer, for example as being defective during a warranty period, may be uniquely identified, for example to determine whether the device is covered by warranty or to identify a manufacturing batch number, for example, for a possible product recall or quality control investigation.

Although an embodiment of the invention has been described in terms of pixels which are atypical by virtue of their dark current, it will be understood that the invention is equally applicable to the location of any distinctive pixels within the array which may be consistently mapped.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

We claim:

1. A size determining system to determine a number of pixels in at least one dimension of a sensor array of photoelectric devices, comprising:
    a. a readout register arranged to receive charge accumulated in the at least one dimension of the sensor array;
    b. a clock arranged to apply clock cycle pulses to the readout register to read out the charge from the readout register for a predetermined number of clock cycles known to exceed a supposed maximum number of pixels in the at least one dimension of the sensor array;
    c. a discontinuity detector operative to determine a first discontinuity in the readout charge, representing a last active pixel in the at least one dimension of the sensor array; and
    d. a counter arranged to count clock cycles between a first active pixel and the first discontinuity to determine a number of active pixels in the at least one dimension of the sensor array.

2. The system as claimed in claim 1, wherein the discontinuity detector further determines a second discontinuity in the readout charge, representing the first active pixel in the at least one dimension of the sensor array; and wherein the counter further counts clock cycles between the first discontinuity and the second discontinuity to determine the number of active pixels in the at least one dimension of the sensor array.

3. The system as claimed in claim 1, further comprising:
comparison means to use the determined number of pixels to identify a type of the sensor array from a predetermined set of array types.

4. The system as claimed in claim 1, wherein the charge includes a dark current charge which is integrated in the sensor array for a predetermined period of time prior to being transferred into the readout register.

5. The system as claimed in claim 1, wherein the charge includes a dark current charge which is integrated in the sensor array for a predetermined period of time.

6. The system as claimed in claim 4, wherein the clock is arranged to repeatedly apply clock cycle pulses to the readout register for different durations of predetermined periods of time and wherein an average number of active pixels is obtained in the at least one dimension of the sensor array.

7. The system as claimed in claim 2, wherein the discontinuity detector determines one of the first or second discontinuity by comparing a moving average of the accumulated charge of preceding pixels with an instantaneous value of the accumulated charge of a currently read pixel.

8. Size determining means as claimed in claim 1, wherein the photoelectric devices comprise CCD devices.

9. Size determining means as claimed in claim 1, wherein the photoelectric devices comprise CMOS devices.

10. A size determining system to determine a number of pixels in a line of a sensor array of photoelectric devices, comprising:
a readout register arranged to receive charge accumulated by the line of the sensor array;
a clock arranged to apply clock cycle pulses to the readout register to read out the charge from the readout register for a predetermined number of clock cycles known to exceed a supposed maximum number of pixels in the line of the sensor array;
a discontinuity detector operative to determine a first discontinuity in the readout accumulated charge, representing a last active pixel in the line of the array; and
a counter to count clock cycles between a first active pixel and the first discontinuity to determine a number of active pixels in the line of the array.

11. The system as claimed in claim 10, wherein the discontinuity detector further determines a second discontinuity in the readout accumulated charge, representing a first active pixel in the line; and the counter further counts clock cycles between the first discontinuity and the second discontinuity to determine the number of active pixels in the line of the sensor array.

12. A size determining system to determine a number of lines of a sensor array of photoelectric devices, comprising:
a readout register arranged to receive charge accumulated in the sensor array;
a clock arranged to apply clock cycle pulses to the readout register to read out the charge from the readout register for at least one pixel for each line of the sensor array for a predetermined number of clock cycles known to exceed a supposed maximum number of lines in the sensor array;
a discontinuity detector operative to determine a first discontinuity in the readout accumulated charge, representing a last active line of the sensor array; and
a counter arranged to count clock cycles between a first active line and the first discontinuity to determine a number of active lines of the sensor array.

13. The system as claimed in claim 12, wherein the discontinuity detector further determines a second discontinuity in the readout accumulated charge, representing the first active line of the array; and the counter further counts clock cycles between the first discontinuity and the second discontinuity to determine the number of active lines of the sensor array.

14. The system as claimed in claim 1, further comprising:
read-out means to read out the accumulated charge from a portion of the sensor array to form an image;
feature extraction means to determine, from the image, features of the sensor array comprising at least one of locations of atypical pixels or relative gray levels corresponding to atypical pixels, in the portion of the sensor array;
signature generation means to label the sensor array and generate a storable signature of the sensor array based on the extracted features of the portion of the sensor array;
storage means for storing the storable signature; and
comparison means to compare the stored signature with a subsequently generated signature for subsequent identification of the sensor array.

15. The system as claimed in claim 14, wherein the sensor array accumulates charge from a dark current.

16. The system as claimed in claim 15, wherein the dark current is increased by at least one of adjusting bias levels applied to the sensor array, increasing a temperature of the sensor arrays, or applying adapted clocking waveforms to the sensor array.

17. The system as claimed in claim 14, wherein the locations of the atypical pixels are determined by subtracting a baseline black level and a dark current floor from the image.

18. The system as claimed in claim 17, wherein subtracting a baseline black level and dark floor current from the image is performed by forming a first image over a first integration time, forming a second image over a second integration time being longer than the first integration time, and subtracting the first image from the second image.

19. The system as claimed in claim 17, wherein subtracting a baseline black level and dark floor current from the image is performed by forming an original image, Gaussian blurring the original image to form a blurred images, and subtracting the blurred image from the original image.

20. The system as claimed in claim 19, further including:
a filter to Gaussian blur the image, wherein the filter has a radius equal to 16 pixels.

21. The system as claimed in claim 14, wherein the relative gray levels of the atypical pixels are determined by applying a gray level threshold at a level at which a predetermined plurality of pixels has gray levels exceeding the threshold and by successively raising the threshold to the gray level of each of the predetermined plurality of pixels to determine the relative gray level of each of the plurality of the atypical pixels.

22. The system as claimed in claim 14, wherein the relative gray levels of the atypical pixels are determined by applying a gray level threshold at a level at which a predetermined plurality of pixels has gray levels exceeding the threshold and by determining a difference in gray level of each of the atypical pixels compared with an average gray level of pixels adjacent to each of the atypical pixels respectively.

23. The system as claimed in claim 14, wherein the signature is generated by generating a map of the determined locations of the atypical pixels of the portion of the sensor array.

24. The system as claimed in claim 14, wherein the signature is generated by generating a signature from the determined locations of the atypical pixels and relative gray levels of the atypical pixels.

25. The system as claimed in claim 14, wherein the signature is generated by generating a histogram from the relative gray levels of the atypical pixels.

26. The system as claimed in claim 14, wherein the atypical pixels are ranked in an order of the gray levels.

27. The system as claimed in claim 14, wherein the signature is generated by fitting a polynomial equation to dark signal non-uniformity of the image.

28. The system as claimed in claim 14, wherein the storage means the stores the storable signature by storing, associable with the storable signatures, at least one of a serial number of the sensor array, a date of manufacture of the sensor array, or a warranty period for the sensor array.

29. The system as claimed in claim 14, wherein the storage means stores the storable signature by storing, associable with the storable signatures, at least one of drive biases suitable for use with the sensor array or image correction information including at least one of dark field, flat field or blemish correction image files.

30. The system as claimed in claim 14, wherein the storage means stores the storable signature in a database.

31. The system as claimed in claim 14, wherein the storage means stores the storable signature in a database remote from an imaging system to which the sensor array is connectable, such that the database is accessible to an imaging system over a communications network.

32. The system as claimed in claim 14, wherein the signature generation means generates a new signature of the sensor array; and the comparison means matches the new signature of the sensor array with the stored signature to identify the sensor array.

33. The system as claimed in claim 14, wherein the comparison means retrieves at least one of a serial number of the sensor array, a date of manufacture of the sensor array, or a warranty period for the sensor array associated with the stored signature.

34. The system as claimed in claim 14, wherein the comparison means retrieves at least one of optimum drive biases suitable for use with the sensor array or image correction information including at least one of dark field, flat field or blemish correction image files associated with the stored signature.

35. An imaging system comprising a size determining system to determine a number of pixels in at least one dimension of a sensor array of photoelectric devices, the size determining system comprising:
   a. a readout register arranged to receive charge accumulated in the at least one dimension of the sensor array;
   b. a clock arranged to apply clock cycle pulses to the readout register to read out the charge from the readout register for a predetermined number of clock cycles known to exceed a supposed maximum number of pixels in the at least one dimension of the sensor array;
   c. a discontinuity detector operative to determine a first discontinuity in the readout charge, representing a last active pixel in the at least one dimension of the sensor array; and
   d. a counter arranged to count clock cycles between a first active pixel and the first discontinuity to determine a number of active pixels in the at least one dimension of the sensor array.

* * * * *